United States Patent [19]

Duijn

[11] Patent Number: 5,308,368
[45] Date of Patent: May 3, 1994

[54] SYSTEM FOR SEPARATION OF MATERIALS USING SUCTION AIR POWER

[75] Inventor: Cornelis G. S. Duijn, Heemskerk, Netherlands

[73] Assignee: Duos Engineering, Inc., Jacksonville, Fla.

[21] Appl. No.: 977,036

[22] Filed: Nov. 16, 1992

[30] Foreign Application Priority Data

May 15, 1990 [EP] European Pat. Off. ......... 90201218.6

[51] Int. Cl.⁵ ...................... B01D 19/00; B01D 46/02
[52] U.S. Cl. ..................... 55/315; 55/341.1; 55/459.1; 239/455
[58] Field of Search ........ 55/315, 341.1, 350, 55/429, 459.1; 239/455, 597, 598

[56] References Cited

U.S. PATENT DOCUMENTS

| | | | |
|---|---|---|---|
| 2,927,424 | 3/1960 | Hyde | 239/455 |
| 4,411,674 | 10/1983 | Forgac | 55/315 X |
| 4,415,297 | 11/1983 | Boring | 55/315 X |
| 4,490,162 | 12/1984 | Davis | 55/315 X |
| 4,572,726 | 2/1986 | Van Abbema | 55/459.1 X |
| 5,127,581 | 7/1992 | Kuwano | 239/455 |

FOREIGN PATENT DOCUMENTS

WO91/17835 11/1991 PCT Int'l Appl. .

*Primary Examiner*—Charles Hart
*Attorney, Agent, or Firm*—Arthur G. Yeager

[57] ABSTRACT

A mixture of material is transported by a vibrating conveyor (B), deposited thereon by belt conveyor (A), before an inlet (11) of a suction mouth (1). Suction mouth (1) is adjustable in all directions and by using the adjustable units (2) mounted on the suction duct (4), the height of the mouth (1) may be adjusted above the transported mixture of materials which is to be treated. The width of the opening (11) of suction mouth (1) is adjustable (20-26) to shape the mouth either symmetrically or asymmetrically. The suction power at the inlet (11) of the suction mouth (1) is regulated by adjusting its width combined with outside air supply using an air inlet valve (3) associated with suction duct (4) and adjustments of the capacity of exhaust fan (8). The exhausted air is fed to a cyclone (5) in which the materials which are sucked up and transported with the air have to be deposited. The behavior and velocity of flow of the air entering cyclone (5) are adjustable by using the air inlet valve (3) and adjustment of fan capacity. The suction of fan (8) is connected at the outlet pipe (7) of the cyclone (5). The air exhausted via fan (8) is blown through a dust filter (9) and collected particles are transported by conveyor (10) into a bag (C).

20 Claims, 2 Drawing Sheets

SYSTEM FOR SEPARATION OF MATERIALS USING SUCTION AIR POWER

TECHNICAL FIELD OF THE INVENTION

The invention relates to a system to separate materials using suction air power provided through an adjustable suction mouth or nozzle, and particularly the separation of material parts having different specific mass or otherwise material parts having different sizes.

BACKGROUND OF THE INVENTION

Systems for separation of materials using adjustable suction power are already described in the Dutch patent specifications 8701807 and 7604097, for example. With the installations mentioned above, the suction power is regulated by using an adjustable valve placed inside of the suction duct. This method suffers from the disadvantage that the behaviour and velocity of the airflow into and through a cyclone have a bad influence on the operation of the cyclone.

This invention, for example, can separate crushed stone, rubbish, different kinds of metal (i.e., after the shredding of cars), glass, compost and paper. The position of the suction mouth is adjustable in all directions as well as the width of opening of the suction mouth. The suction power at the inlet of the nozzle is also adjustable. With this invention exhausted air containing materials is fed through a cyclone to deposit those materials and overcomes the foregoing prior art problems.

Regulation of the air velocity in pipes supplying air using air inlet valves are also known. The disadvantage of such a regulation is the adjustment of suction power which is only possible at the inlet of the suction mouth.

For the best results of separating the materials it is necessary to combine the adjustment of suction power and the adjustment of the width and position of the suction mouth in accord with this invention.

An object of this invention is to create a system which is suited to separate as many as possible different kinds of materials and as many different sizes of material parts. This can be accomplished by the provision of the adjustment of suction power and the position and width of the suction mouth. Therefore it is required that the state of the exhausted aid, in its behaviour and velocity, makes it possible for the parts of material exhausted to deposit in a cyclone.

BRIEF SUMMARY OF INVENTION

The system comprises a feeding device or conveyor belt which deposits materials on a vibrating conveyor. The vibrating conveyor functions to cause the heavier particles to settle to the bottom of the layer of materials on such conveyor while the lighter particles tend to be moved or shifte to the layer's surface. Such a function enhances the separation of the lighter particles from the heavier particles at the suction mouth or nozzle which is placed above the point of discharge of the vibrating conveyor belt. The width of the opening of the suction mouth is adjustable. The position of the suction mouth is adjustable in all directions and it is possible to variate the height of the suction mouth above the pouring mixture of the materials. The heavier or the bigger parts of material will pass the edge of the vibrating conveyor and fall downwardly for collection. The lighter or the smaller parts will be sucked up. Since the particles are in free fall off the end of the vibrating conveyor, there is a vacuum acting on the top side of the material which is the lighter partieles. On the bottom side of the lighter particles atmospheric pressure is acting against the lighter particles to aid in forcing lighter particles perhaps trapped between heavier particles to the vacuum side to further enhance separation. The suction power is provided by a fan or blower which is placed behind the cyclone. The fan is adjustable so that the suction power may be more readily controlled depending on the types of the materials to be separated, etc.

By regulating the width of opening of the suction mouth and using an air inlet valve to supply air in the suction duct and the adjustability of the fan it is possible, firstly to regulate the suction power at the inlet side of the suction mouth and secondly to adjust the air behaviour and velocity in the suction duct which leads to the cyclone. Then the exhausted materials are lead through the cyclone where the materials are to be deposited. The deposited materials can be discharged from the cyclone by means of a rotary valve. The air exhausted with the fan is finally blown through a dust filter. The collected dust inside the filter can be discharged using a conveyor screw.

DETAILED DESCRIPTION OF THE INVENTION

The mixture of materials which has to be separated are fed by a feeding device or conveyor belt A. The best result of separation of the different fractions of the mixture will be obtained, if the fed materials are well spread before treatment. Therefore it is necessary to spread the parts of materials in front of the inlet of the suction mouth 1 using a vibrating conveyor B. The mixture of the layer of lighter particles on top and heavier particles on the bottom adjacent the vibrating conveyor falls over the edge of the vibrating conveyor B in a free fall. The heavier or the bigger particles of material will fall downwardly, while the lighter or the smaller particles are vacuumed up by the suction mouth.

Figure 2:
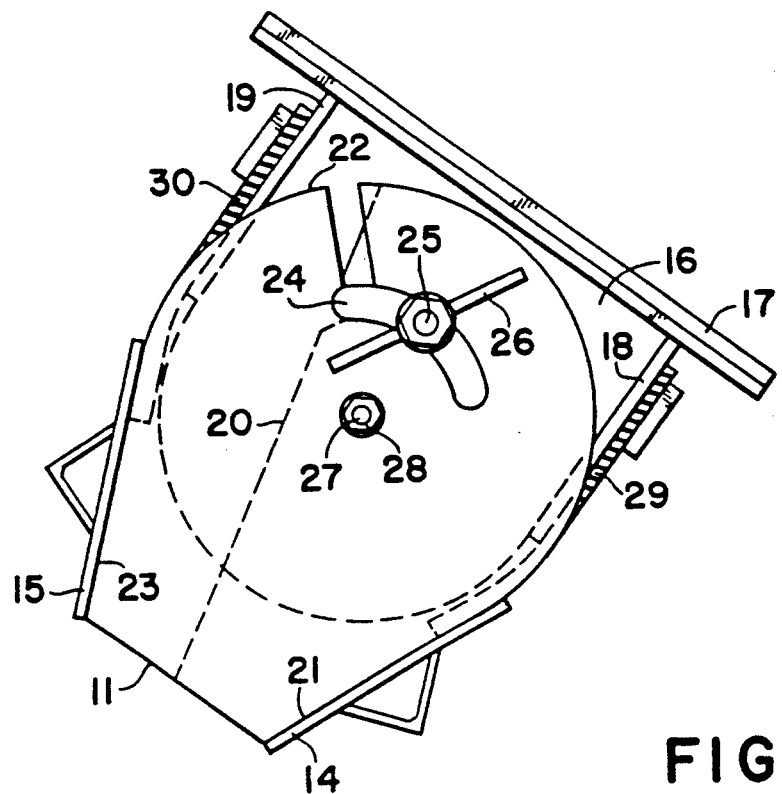
FIG. 2 shows the details of construction of the adjustable suction mouth.
Figure 3:
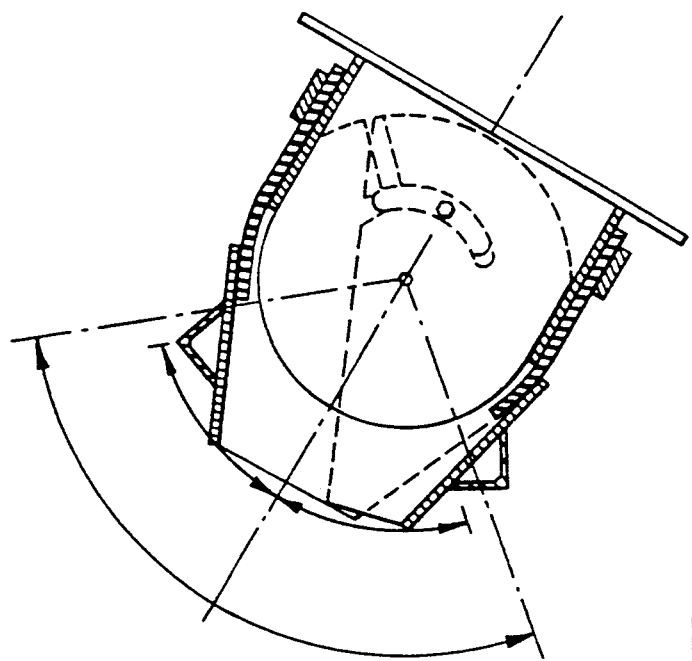
FIG. 3 shows the range of adjustments for the suction mouth.

The opening 11 of the suction mouth 1 is shown more specifically in FIG. 2 and includes two separate sections 14 and 15. A plate 16 with a rounded forward form is welded, at both ends of sections 14 and 15, to a framework 17 having a pair of spaced horizontally extending members 18 and 19. Section 14 includes a pair of partial inner end plates 20 connected to each end of strip 21, while section 15 includes a pair of outer end plates 22 connected to each end of strip 23. Each of plates 20 and 22 include an arcuate or curved slot 24 which are aligned and a threaded bolt 25 passes therethrough onto which wing nut 26 is tightened and untightened for adjustment. By loosening nut 26 on bolt 25 the width of opening 11 can be changed characterized in that it is possible to move both sections 14 and 15 separately in relation to each other. Thus the suction mouth 1 can be adjusted and fixed in a symmetric or asymmetric shape as required, as illustrated in FIG. 3. Flexible air seals 29 and 30 are mounted to respective members 18 and 19 and extend throughout the length of and slidingly engage strips 21 and 23 in any of their adjusted positions.

Figure 1:
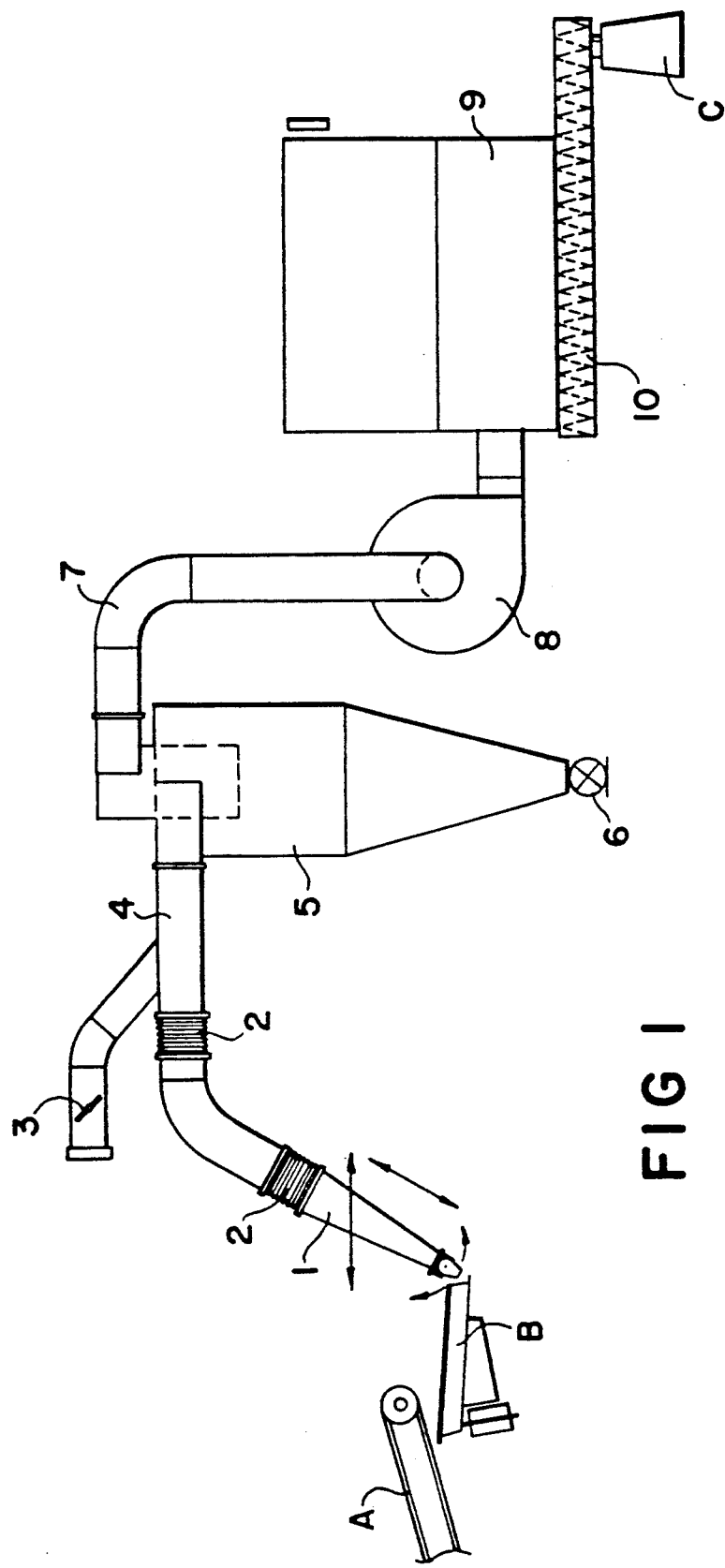
FIG. 1 shows the complete system according to this invention.

The suction mouth 1 is also mounted for limited rotative positioning on spaced and aligned bolts 27 and nuts 28 so that it is possible to change the position of the complete suction mouth 1, and this makes it possible to place the suction mouth 1 in any direction and position, illustrated in FIG. 3, above the falling mixture of materials of FIG. 1. Then the distance between the suction mouth and the falling mixture of materials from vibrating conveyor B of FIG. 1, is also important and can be adjusted in a horizontal as well as in a vertical way by using the adjustable units 2 mounted on the suction duct 4. The suction power at the inlet opening 11 of the suction mouth 1 is regulated in a way that all desired particles of material are sucked up, in three ways by adjusting the width of opening of the suction mouth 1, by changing the suction power at the inlet 11 of the suction mouth 1 by supplying air using an air inlet valve 3 in duct 4, and adjusting the suction power of the fan or blower 8. Accordingly, an important feature is to adjust the suction power at the inlet 11 of the suction mouth 1 combined with adjustment of the width of inlet 11 of the suction mouth 1 and adjusting the fan 8.

Regulation of the velocity of air inside the exhaust pipe 10, which is necessary because the air exhausted contains particles of material together with the air supplied through a cyclone 5. The behaviour and velocity of flow of the air into the cyclone 5 influences the working of cyclone 5 and therefore dictates the manner in which the exhausted particles will deposit therefrom. The speed of the air into the cyclone 5 can be adjusted in a way that deposition of particles inside the cyclone will be optimal by appropriate adjustment of the suction power of the fan 8. The particles deposited inside the cyclone 5 are discharged by a rotary valve 6 mounted at the bottom of cyclone 5. The air outlet 7 of cyclone 5 is connected to the air inlet of the fan 8. The air exhausted by fan 8 is finally lead through a dust filter 9 to comply with requirements of emission of such air. Dust collected with the dust filter 9 can be discharged to a dust bag C by means of a conveyor screw 10 or a conveyor belt.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

I claim:

1. A system for separating a mixture of materials having particles and other particles using suction air through a suction nozzle having an inlet from a fan via a duct, a vibrating conveyor for supplying the materials toward said nozzle with the particles migrating upwardly and the other particles migrating downwardly, first support means for positioning said nozzle above and with said inlet spaced downstream from the end of said conveyor to permit the materials to free fall therefrom prior to the particles being sucked up by said nozzle through said inlet with the atmospheric air pressure aiding the particles trapped between the other particles to be moved toward and into said inlet of said nozzle, said inlet of said nozzle having a length and a width, the improvement comprising adjustable means for varying the width of said inlet without varying the length of said inlet.

2. The system of claim 1 wherein said first support means includes adjusting means for movement of said nozzle in all directions with respect to said conveyor.

3. The system of claim 1 wherein said nozzle is symmetrical about an axis passing through said nozzle and said first support means, said adjustable means varying the width of said inlet symmetrically with respect to said axis or asymmetrically with respect to said axis.

4. The system of claim 3 wherein said nozzle includes a pair of sections forming said inlet each section being independently movable with respect to each other.

5. The system of claim 1 wherein said first support means includes a pair of spaced adjustable devices for universally adjusting said nozzle in all directions with respect to said conveyor and adjusting its height above the materials which free fall from said conveyor.

6. The system of claim 1 further comprising an adjustable outside air inlet valve communicating with said duct between said nozzle and said fan for controlling the velocity of air within said duct.

7. The system of claim 5 further comprising a cyclone communicating with said duct between said nozzle and said fan, said cyclone receiving particles of material and air from said nozzle and causing such particles to be deposited therein and exhausting air and filterable fines of such materials to exit therefrom to said fan.

8. The system of claim 7 further comprising a filter means downstream of said fan to filter the fines of such materials and exhaust the air to the atmosphere.

9. The system of claim 7 wherein said cyclone has an air inlet duct and an air exit duct, further comprising means to adjust the capacity of said fan and thus regulate the speed of air in said air inlet duct to enhance the particles of material being deposited in said cyclone.

10. The system of claim 6 further comprising a cyclone communicating with said duct between said air inlet valve and said fan, said cyclone receiving particles of material and air from said nozzle and causing such particles to be deposited therein and exhausting air and filterable fines of such materials to exit therefrom to said fan.

11. The system of claim 10 further comprising a filter means downstream of said fan to filter the fines of such materials and exhaust the air to the atmosphere.

12. The system of claim 10 wherein said cyclone has an air inlet duct and an air exit duct, further comprising means to adjust the capacity of said fan and thus regulate the speed of air in said air inlet duct to enhance the particles of material being deposited in said cyclone.

13. The system of claim 1 further comprising a cyclone communicating with said duct between said nozzle and said fan, said cyclone receiving particles of material and air from said nozzle and causing such particles to be deposited therein and exhausting air and filterable fines of such materials to exit therefrom to said fan.

14. The system of claim 13 further comprising a filter means downstream of said fan to filter the fines of such materials and exhaust the air to the atmosphere.

15. The system of claim 13 wherein said cyclone has an air inlet duct and an air exit duct, further comprising means to adjust the capacity of said fan and thus regulate the speed of air in said air inlet duct to enhance the particles of material being deposited in said cyclone.

16. The system of claim 1 wherein said first support means includes a pair of spaced adjustable devices for universally adjusting said nozzle in all directions with respect to said conveyor and adjusting its height above the materials which free fall from said conveyor.

17. The system of claim 1 further comprising an adjustable outside air inlet valve communicating with said duct between said nozzle and said fan for controlling the velocity of air within said duct.

18. A system for separating a mixture of materials having particles and other particles using suction air through a suction nozzle having an inlet from a fan via a duct, a vibrating conveyor for supplying the materials toward said nozzle with the particles migrating upwardly and the other particles migrating downwardly, first support means for positioning said nozzle above and with said inlet spaced downstream from the end of said conveyor to permit the materials to free fall therefrom prior to the particles being sucked up by said nozzle through said inlet with the atmospheric air pressure aiding the particles trapped between the other particles to be moved toward and into said inlet of said nozzle, said inlet of said nozzle having a length and a width, the improvement wherein said first support means includes a pair of spaced adjustable devices for universally adjusting said nozzle in all directions with respect to said conveyor and adjusting its height above the materials which free fall from said conveyor.

19. The system of claim 18 further comprising adjustable means for varying the width of said inlet without varying the length of said inlet.

20. A system for separating a mixture of materials having particles and other particles using suction air through a suction nozzle having an inlet from a fan via a duct, a vibrating conveyor for supplying the materials toward said nozzle with the particles migrating upwardly and the other particles migrating downwardly, first support means for positioning said nozzle above and with said inlet spaced downstream from the end of said conveyor to permit the materials to free fall therefrom prior to the particles being sucked up by said nozzle through said inlet with the atmospheric air pressure aiding the particles trapped between the other particles to be moved toward and into said inlet of said nozzle, said inlet of said nozzle having a length and a width, the improvement wherein said first support means includes adjusting means for movement of said nozzle in all directions with respect to said conveyor, adjustable means for varying the width of said inlet without varying the length of the inlet, said nozzle having a pair of sections forming said inlet with each said section being independently movable with respect to each other.

* * * * *